(No Model.) 3 Sheets—Sheet 1.
M. W. GILMARTIN.
WEIGHING SCALE ATTACHMENT.
No. 576,962. Patented Feb. 9, 1897.
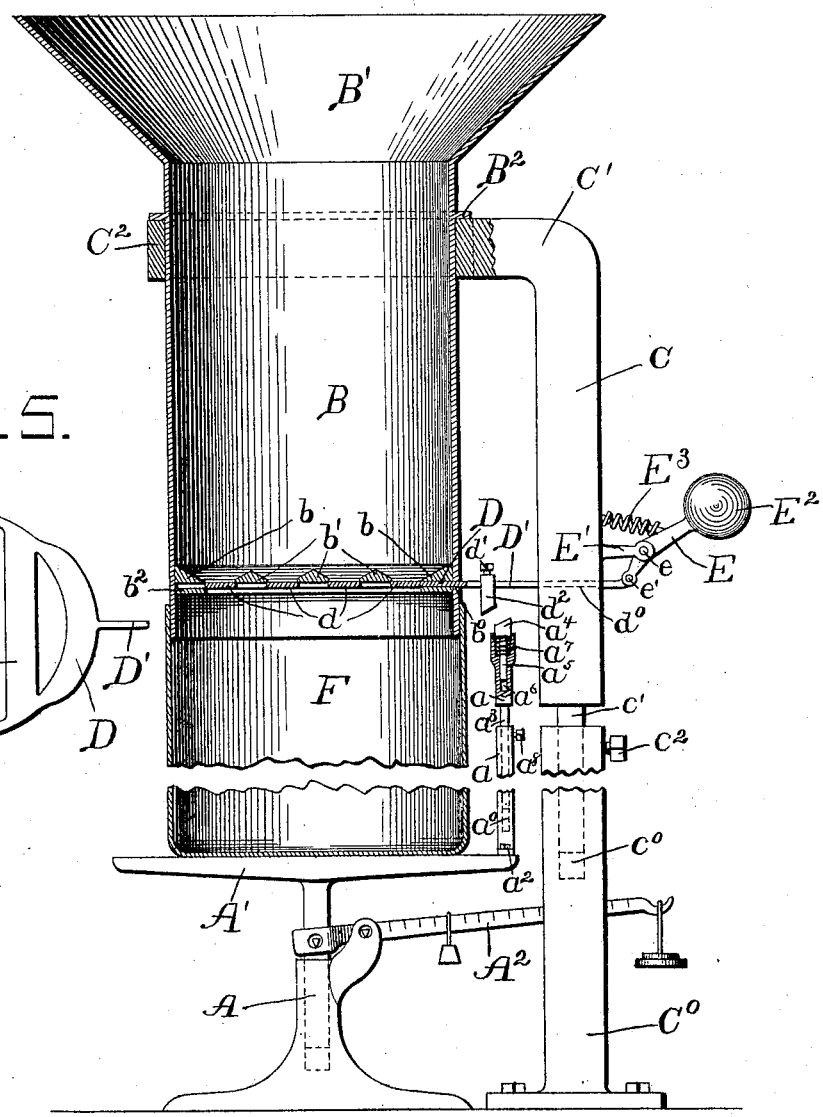

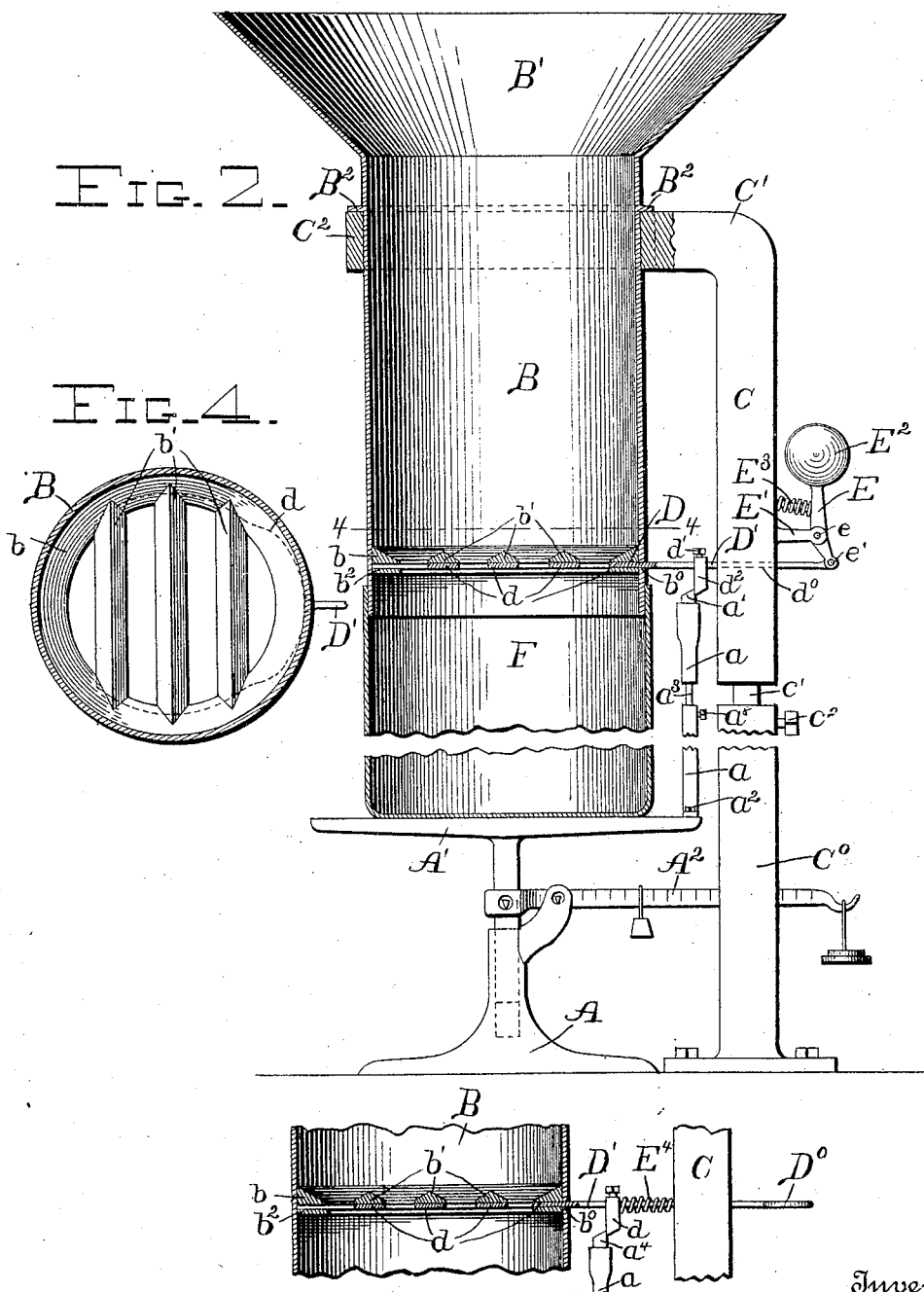

(No Model.)
3 Sheets—Sheet 3.
M. W. GILMARTIN.
WEIGHING SCALE ATTACHMENT.
No. 576,962. Patented Feb. 9, 1897.
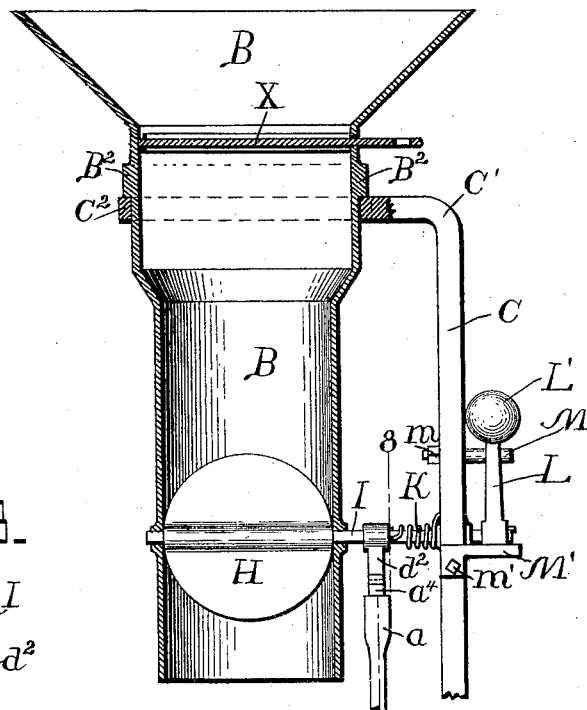
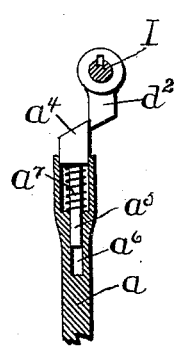
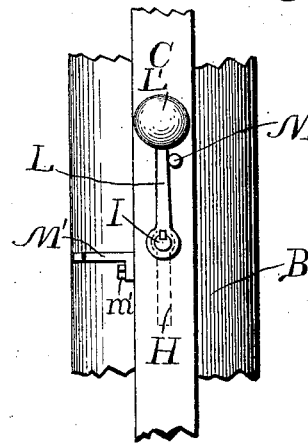
Witnesses
D. H. Blakelock.
John C. Wilson.
Inventor
M. W. Gilmartin,
by Whitman & Wilkinson
Attorneys.

UNITED STATES PATENT OFFICE.

MICHAEL W. GILMARTIN, OF THE UNITED STATES NAVY.

WEIGHING-SCALE ATTACHMENT.

SPECIFICATION forming part of Letters Patent No. 576,962, dated February 9, 1897.

Application filed June 30, 1896. Serial No. 597,627. (No model.)

*To all whom it may concern:*

Be it known that I, MICHAEL W. GILMARTIN, gunner United States Navy, a citizen of the United States, stationed at the United States Navy-Yard, Brooklyn, in the county of Kings and State of New York, have invented certain new and useful Improvements in Automatic Weighing-Scale Attachments; and I do hereby declare the following to be a full, clear, and exact description of the invention, such as will enable others skilled in the art to which it appertains to make and use the same.

My invention relates to improvements in weighing-scale attachments, and has for its object to provide suitable devices for use in connection with a weighing-scale whereby a number of packages of a predetermined weight may be rapidly and accurately weighed from a bulk of the material being weighed.

My invention consists in the novel devices hereinafter described and claimed.

Reference is had to the accompanying drawings, wherein the same parts are indicated by the same letters throughout the several views.

Figure 1 is a sectional elevation of one form of my apparatus, showing the scale-platform down and the cut-off in the hopper closed. Fig. 2 is a similar view showing the scale-platform up and the cut-off open. Fig. 3 is a partial sectional elevation showing the cut-off slide as operated by a coil-spring alone. Fig. 4 is a horizontal section through the hopper or funnel, taken on the line 4 4 of Fig. 2. Fig. 5 is a detail plan view of the cut-off slide shown in Figs. 1 to 4. Fig. 6 is a sectional elevation of another form of my apparatus, parts being broken away and the scale omitted. Fig. 7 is a partial view of the devices shown in Fig. 6 as seen from the right in said figure, and Fig. 8 is a vertical section taken on the line 8 8 in Fig. 6.

Referring more particularly to Figs. 1 to 5, inclusive, A represents a weighing-scale, which may be of any suitable well-known construction, having a scale-beam $A^2$ and a pan or platform $A'$ thereto.

B represents a hopper preferably cylindrical in form and having funnel-shaped upper end $B'$ for the reception of the material to be weighed. This cylindrical hopper is supported above the scale pan or platform by means of an upright standard C, having horizontal arm $C'$, carrying a hollow ring $C^2$, into which ring the hopper fits and is held by means of a flange $B^2$, which rests upon said ring. A grating composed of a beveled ring $b$ and beveled cross-bars $b'$ is securely mounted within the hopper B near its lower end, and the ring $b$ has a flange $b^2$ on its under side, forming a support for the cut-off slide.

D represents the cut-off slide, which is provided with cross-bars $d$ and which is adapted to slide freely in the space between the ring $b$ and the flange $b^2$. The spaces between the cross-bars $b'$ and the spaces between the bars $d$ are of the same width, as are also the said bars $b'$ and $d$ the same width, so that when the cut-off slide is open the bars $b'$ will entirely cover the bars $d$, and yet when the said slide is closed the bars $d$ will entirely close the spaces between the bars $b'$. The slide D is provided with an operating-rod $D'$, which works through a slot $b^0$ in the side of the hopper B. This rod $D'$ also works through an opening in the standard C, as shown at $d^0$ in dotted lines in Figs. 1 and 2.

A lever E, fulcrumed, as at $e$, upon an arm $E'$, rigidly mounted upon the standard C, is pivoted at its lower end to the outer end of the rod $D'$, as shown at $e'$, and carries a weight $E^2$ upon its upper end. The upper arm of this lever, upon which the weight is mounted, is approximately vertical when the slide is open, and in falling closes the slide.

An upright $a$ is rigidly mounted upon the side of the scale pan or platform $A'$ which is nearest the standard C by means of bolts, as shown at $a^2$, or in any other suitable way. A beveled catch $a^4$, having a spindle $a^5$, which fits into a socket $a^6$ in the upper end of the upright $a$, is carried thereby, and is normally pressed upward by a coil-spring $a^7$, as seen in Figs. 1 and 8.

A sliding block $d^2$, having its lower end beveled to correspond with the beveled catch $a^4$, is mounted upon the slide-operating rod $D'$, and is adjustably held thereon by means of a clamping-screw $d'$. When the slide D is in the closed position, the sliding block $d^2$ will occupy a position relative to the catch $a^4$, such as is shown in Fig. 1.

To open the slide, if the scale-platform be up, the weight is raised to the vertical position and the block $d^2$ will move past the end of the catch $a^4$, where it will be caught and held, as shown in Fig. 2, until the scale-platform goes down again, when the catch $a^4$ will be moved past the end of the block $d$ by reason of the upright $a$ descending with the scale-platform, and the weight will fall, and, pushing the slide D inward, close the same, as shown in Fig. 2.

A spring $E^3$ should preferably be provided to start the weight falling, as shown in Figs. 1 and 2.

Instead of the falling weight hereinbefore described, I may use simply a coil-spring, which is interposed between the standard C and the block $d^2$, as seen at $E^4$ in Fig. 3, and in this form I would have a hand-grip $D^0$ upon the end of the rod $D'$ for opening the slide.

In Figs. 6 and 7 I have illustrated a modified arrangement of the falling weight and a modified form of cut-off. In these figures H represents a circular disk or plate which is rigidly mounted upon the rocking shaft I, journaled in the sides of the hopper B. An arm L is rigidly mounted upon the end of the rocking shaft I and carries a weight $L'$. This weight is adapted to fall and close the cut-off by turning the same to a horizontal position, the weight being locked in the open position by means of the catch $a^4$ and block $d^2$ in the same manner as hereinbefore described with reference to Figs. 1 and 2. A stop M, bolted to the upright C, as at $m$, limits the movement of the arm L in rising, and the stop $M'$, bolted, as at $m'$, to the standard C, limits the movement of the said arm in falling. The spring K acts to start the weight falling.

In order to adjust the hopper and tripping attachment for packages of different heights, the upper portion of the standard C has a reduced foot $c'$, which fits into a socket $c^0$ in the base portion $C^0$ of the said standard and is held by a clamp-screw $c^2$. The upright $a$ is also made extensible by having a foot $a^3$ upon its upper portion adapted to fit into a socket $a^0$ in the base portion thereof and be clamped by a screw $a^8$. By this means the hopper may be readily and easily adjusted for filling and weighing packages of any ordinary size and height.

If desired, I may have a slide in the hopper above the cut-off, as shown in Fig. 6, at X, but this would not be necessary except where the hopper is large and contains a large mass of material, which would, by reason of its weight, prevent the accurate working of the cut-off.

The operation of the apparatus is as follows: The parts being in the position shown in Fig. 2 and the weights set on the scale-beam $A^2$ for the proper weight of the package or packages to be weighed, the material to be weighed is poured into the hopper and falls through the bottom thereof past the cut-off into the bag or other package provided beneath until the pan or platform of the scale descends, when the downward movement of the upright $a$ on the pan or platform of the scale will release the catch $a^4$, carried thereby, from engagement with the block $d$, and the tension on the spring $E^3$ will start the weight $E^2$ to falling, and the weight falling quickly will push the slide inward and cut off the flow of the material instantly. The parts will then occupy the position shown in Fig. 1. The package may then be removed and an empty one substituted therefor. As soon as the filled package is removed the scale pan or platform will rise, carrying with it the upright $a$ and the catch $a^4$. The weight then being raised, the rod $D'$ will be withdrawn and the block $d^2$ will become locked behind the catch $a^4$ and the slide held open until the next package is filled.

In the form shown in Fig. 3, where only a spring is used for closing the slide, the operation is precisely the same, the spring acting in the place of the weight.

In the form shown in Figs. 6 and 7 the weight in falling turns the shaft I and cut-off H through an angle of ninety degrees, the shaft I being locked against rotation in the same manner as the slide against sliding.

It will be obvious that my apparatus may be adapted for use in weighing a variety of articles, such as flour, sugar, meal, coffee, such as are found in an ordinary grocery-store, or it may be adapted for use on a larger scale in mills, grain-houses, and the like for weighing large quantities of wheat, corn, or other grain from a mass.

It will be obvious that many modifications of my apparatus might be made which could be used without departing from the spirit of my invention.

Having thus described my invention, what I claim, and desire to secure by Letters Patent of the United States, is—

1. The combination with a weighing-scale, of an upright standard having a horizontal arm at its upper end; a hopper supported by said horizontal arm above the scale pan or platform; a grated bottom fixed in said hopper and having beveled upper surface; a slideway beneath said grated bottom; a flat grated slide adapted to work in said slideway and to open or close the interstices of said grated bottom; a horizontal rod connected to said slide and working in a suitable support; means acting upon said rod tending to close said slide; a block adjustably mounted upon said rod; a rigid vertical arm mounted upon the pan or platform of said scale; and a spring-catch mounted in the upper end of said vertical arm and adapted to engage said block and hold said slide open when the scale is up, but to become disengaged from said block and allow the said slide to shut when the scale descends, substantially as described.

2. The combination with a weighing-scale, of an upright standard having a horizontal arm at its upper end; a hopper supported by said horizontal arm above the scale pan or platform; a grated bottom fixed in said hopper and having a beveled upper surface thereto and a flat under surface; a slideway beneath said grated bottom; a flat grated slide adapted to work in said slideway and to open or close the interstices of said grated bottom; a horizontal rod connected to said slide and working in a suitable support; a lever-arm fulcrumed to said support and pivotally connected at one end to said rod; a weight mounted upon the opposite end of said lever-arm and tending to thrust said rod longitudinally of itself and thus close said slide; a block mounted upon said rod; a rigid vertical arm mounted upon the pan or platform of the scale; and a spring-catch mounted in the upper end of said vertical arm and adapted to engage said block and hold said slide open against the action of said weight, when the scale is up, but to become disengaged from said block and allow the said slide to shut when the scale descends, substantially as described.

3. The combination with a weighing-scale, of a vertically extensible upright having a horizontal arm at its upper end; a hopper supported by said horizontal arm above the scale pan or platform; a grated bottom having a beveled upper and a flat lower surface fixed in said hopper; a slideway beneath said grated bottom; a flat grated slide adapted to work in said slideway and to open or close the interstices of said grated bottom; a horizontal rod connected to said slide and working in a suitable support; a lever-arm fulcrumed to said support and pivotally connected at one end to said rod; a weight mounted upon the said lever-arm and tending to thrust said rod longitudinally of itself and thus close said slide; a block mounted upon said rod; a rigid vertically-extensible arm mounted upon the pan or platform of the scale; and a spring-catch mounted in the upper end of said arm and adapted to engage said block and hold said slide open against the action of said weight when the scale is up, but to become disengaged from said block and allow said slide to shut when the scale descends, substantially as described.

4. The combination with a weighing-scale, of an upright standard having a horizontal arm at its upper end; a hopper supported by said horizontal arm; a cut-off mounted in the lower part thereof; a horizontal arm rigidly connected to said cut-off and passing through said upright standard; an arm connected to said rod; a weight mounted upon one end of said arm and tending to hold said cut-off closed; stops limiting the throw of said arm and weight; a block adjustably mounted upon said rod; a rigid vertical arm mounted upon the pan or platform of the scale; and a spring-catch carried by said arm adapted to engage said block and hold said cut-off open when the scale is up, but to become disengaged therefrom and allow said cut-off to shut when the scale descends, substantially as described.

5. The combination with a weighing-scale, of an upright standard having a horizontal arm at its upper end; a hopper supported by said horizontal arm; a cut-off mounted in the lower part thereof; a horizontal rod connected to said cut-off and working in an opening through said upright standard; means acting upon said rod tending to close said cut-off; a block mounted adjustably upon said rod; a rigid vertical arm mounted upon the pan or platform of the scale; and a spring-catch carried by said arm adapted to engage said block and hold said slide open when the scale is up, but to become disengaged therefrom and allow said slide to close when the scale descends, substantially as described.

In testimony whereof I affix my signature in presence of two witnesses.

MICHAEL W. GILMARTIN.

Witnesses:
WM. H. KLUGMAN,
C. H. BOGAR.